UNITED STATES PATENT OFFICE.

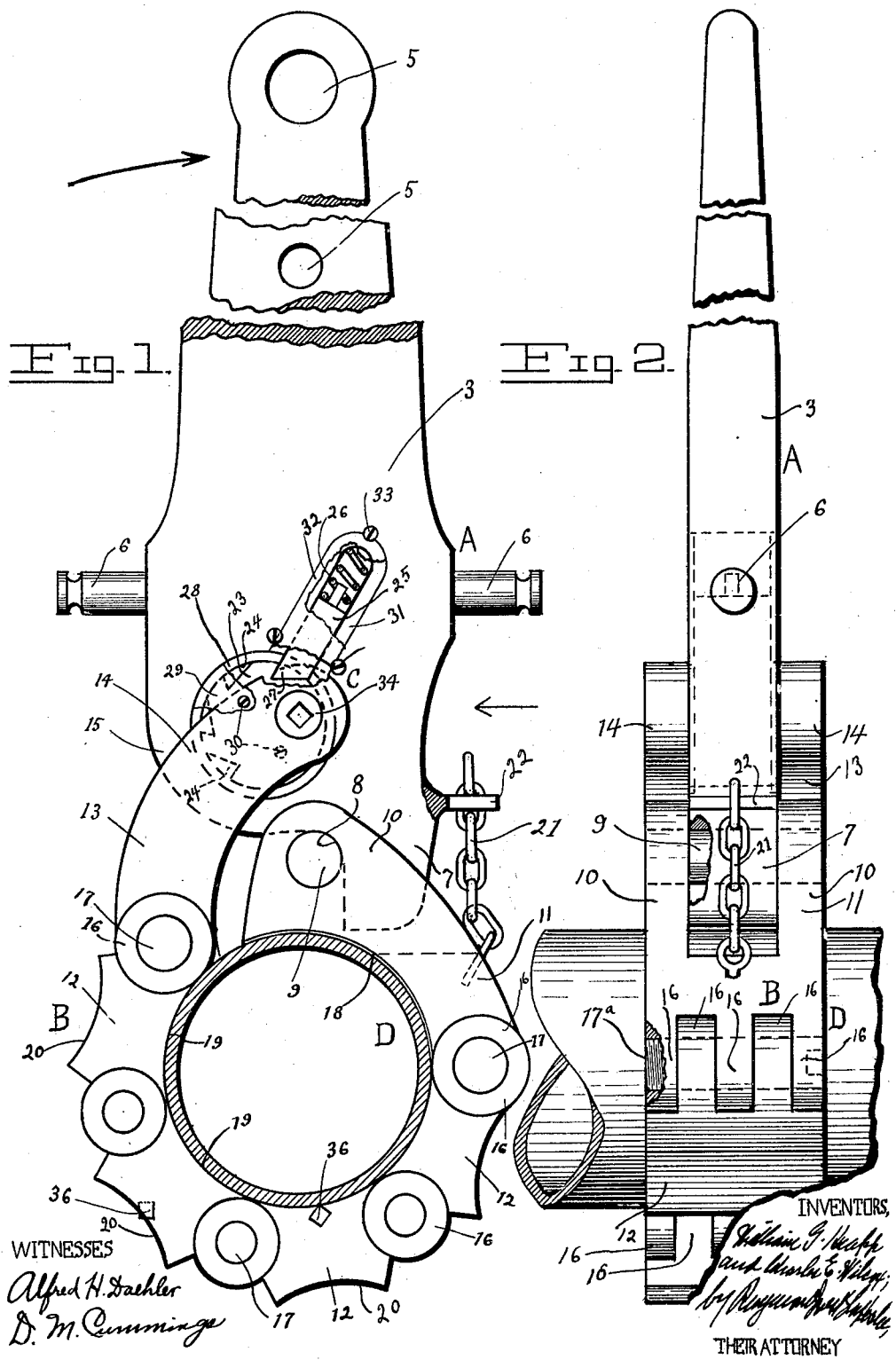

WILLIAM G. KNAPP, OF ALHAMBRA, AND CHARLES E. WILCOX, OF EAST BAKERSFIELD, CALIFORNIA.

PIPE-WRENCH.

1,102,517.  Specification of Letters Patent.  Patented July 7, 1914.

Application filed May 24, 1913. Serial No. 769,679.

*To all whom it may concern:*

Be it known that we, WILLIAM G. KNAPP and CHARLES E. WILCOX, citizens of the United States, residing, respectively, at Alhambra, county of Los Angeles, and State of California, and at East Bakersfield, county of Kern, and State of California, have jointly invented new and useful Improvements in Pipe-Wrenches, of which the following is a specification.

This invention relates to pipe wrenches or tongs, and more particularly to large pipe wrenches for handling heavy or large work such as pipe or casing used in deep oil wells, but likewise adapted to handle or for use in connection with other large or heavy work; and the invention has for its object to provide an improved pipe wrench or improved tongs, particularly adapted for handling such heavy or large work, and which will be superior in point of relative simplicity and inexpensiveness of construction and organization taken in connection with positiveness in operation, durability or length of life, facility in adjustment of its working parts, convenience in use and positiveness in operation, and which will be generally superior in efficiency and serviceability.

With the above and other objects in view, the invention consists in the novel and useful provision, formation, construction, combination and relative arrangement and mode of use and application of parts, members and features, all as hereinafter described, shown in the drawing, and finally pointed out in claims.

In the drawing: Figure 1 is a plan view or face view of a pipe wrench or tongs constructed and organized in accordance with the invention, parts being broken away for facility in illustration; and Fig. 2 is an edge view of the same looking in the direction of the arrow between Figs. 1 and 2.

The device is shown in both figures, as applied to a fragment or portion of a joint of pipe, casing, or tubing for the manipulation or rotation thereof.

Corresponding parts in both figures are designated by the same reference characters.

Referring with particularity to the drawing, the improved pipe wrench or tongs therein shown comprises a handle member A with which is operatively connected a flexible work gripping member B, adjusting means C being provided for fitting the member B to the work, as shown at D as consisting of a length or portion of pipe or the like. The adjusting means C are carried by the handle member A at one end of which the member B is disposed.

The handle member A comprises an elongated body 3 having at the end opposite the gripping member B one or more openings 5 at which operating means or tackle may be hooked on to the handle member to turn the wrench. Between its ends the body 3 is provided with bearings or trunnions 6 to which suitable suspension means, not shown, may be applied, for supporting the wrench, and made necessary in wrenches of large size or heavy weight such as used for manipulating the tubing or casing of oil wells. The end of the body 3 at which the gripping member B is arranged is provided with a projecting nose 7 one side of which merges into the body 3 in a formation producing a curved seat 8 to which is applied a vertical pin or bar 9 passing through the furcations 10 of a forked end link 11 which straddles the nose 7 and is included in a chain comprising further body links 12 and another end link 13 forked to produce furcations 14 and straddling the rounded end portion 15 of the body 3 at one side and inward of the nose 7. The end link 11 is provided with three spaced knuckles 16, and each of the body links 12 is provided at one end with two such spaced knuckles 16 and at the other end with three of the same whereby the body links are connected together in chain by pintles 17, and are connected with the end links 11 and 13, the end link 13 having two knuckles 16 held to the three knuckles on the end of the next adjacent body link 12. The inner face of the end link 11 is curved, as at 18, for presentation to the work; and both the inner faces 19 and the outer faces 20, as arranged in the drawing, of the body links 12, are curved to fit the work, such as the pipe D shown in the drawing, the curvature of each of the inner faces 19 being of a greater radius than the curvature of each of the outer faces 20. The body links may be separated from the end links 11 and 13 at the pintles 17 and reversed face for face, and again re-connected with the end links, so that the faces 20 of sharper curvature may be presented to work of smaller diameter than the pipe shown in the drawing, so as to more properly fit such smaller work.

The flexible work gripping member B thus comprises the end links 11 and 13 and the body links 12 and the connections between the same. A tie chain or similar device 21 extends between the end link 11 and the handle member body 3, being engaged detachably with a slotted abutment 22 projecting from one side of the body 3.

The adjusting means C comprise a cylindrical body 23 rotatable in a chamber produced vertically through the handle member body 3 inward of the nose 7 and rounded end portion 15, and having a close working fit in such chamber, such body having a plurality of peripheral vertical notches 24 with which is adapted to coöperate a pawl or latch 25 mounted to play endwise in a vertical chamber formed in the body 3 at one side of the chamber accommodating the cylindrical body 23, and urged against the body 23 by a compression spring 26 in the same chamber which contains latch 25, which latter has a beveled end portion or nose 27 adapted to take into the respective notches 24, such latch playing radially of the body 23. The body 23 is of slightly less height than the vertical thickness of the body 3, and the chamber containing such body 23 is chamfered or enlarged slightly, at top and bottom, as at 28, to receive two circular retaining plates 29 each screwed to the body 23, at top and bottom respectively, as at 30. Likewise, the chamber accommodating the latch 25 is chamfered out at top and bottom as at 31 to receive retaining plates 32 held to the handle member body 3 by screws 33. The furcations 14 of the end link 13 are eccentrically connected with the cylindrical body 23 through the retaining plates 29, by crank pins 34 having squared openings 35 to receive a suitable implement or tool for operating the adjusting means C in entirety.

The operation, method of use and advantages of the improvements in pipe wrenches or tongs constituting the invention can be readily understood from the foregoing description taken in connection with the accompanying drawing and following statement: The pipe wrench or tongs may be swung into position when suspended by suitable means applied to the trunnions 6, the flexible gripping member B passed about the work, the end link 13 connected with the crank pins 34, and the pin 9 brought against the curved seat 8 on the handle member where the nose 7 joins the body 3. The proper faces 19 or 20 of the body links 12 are brought to bear against the work, in accordance with the diameter and conformation of the work, the chain being reversed as to its faces, as herein stated, by slipping out or detaching the end pintles 17, which may be threaded as at 17$^a$, then turning the chain containing the body links 12 over, and re-connecting such body links to the end links 11 and 13 by the end pintles 17. The cylindrical body 23 of the adjusting means C is rotated, as by suitable implements or a suitable implement applied to crank pins 34, until the chain of the member B is drawn tightly against the work D, when the pawl or latch 25 will hold the cylindrical body 23 in position of such adjustment. The handle member A is then swung in the direction denoted by the curved arrow adjacent to Fig. 1, and, both ends of the chain being held to the handle member, the links at their faces 19 or 20 will grip the work and rotate or move it. In such gripping action the end link 13 is pulled upon by the handle member and the end link 11 is pushed upon by the nose 7 and the pin 9 at a point between the adjusting means C and the work. Upon a reverse swing of the handle member, the chain of the member B loosens up, the reverse action taking place, and the retaining chain 21 prevents the end link 11 from riding free of the nose 7. The gripping member B thus rides freely over or around the work, until the handle member is again swung in the direction denoted by the curved arrow, when the gripping action is again set up and a further movement imparted to the work.

When the faces 20 of the body links 12 of the member B are presented to the work and engage the same in close fit, such work, a pipe or the like, being of smaller diameter than the pipe or work D shown in the drawing, the member B is of less diameter internally. This decrease of diameter is permitted by arranging the pintles 17 laterally of the true central portions of the links 12 or closer to the faces 19 of such body links which are of greater diameter. The hinges constituted between knuckles 18 and pintles 17 thus permit the body links to be swung into a larger arc for presentation of the faces 19 to the work, or into a smaller arc for presentation of the faces 20 to the work.

The links 12 of the member B may be provided with in-set relatively harder gripping heads or teeth 36, at the faces 19 and 20, to produce a more positive engagement of the links with the work, effectively biting the work and preventing any slip between it and the gripping member.

The adjusting means C enable the gripping member to be conveniently brought to proper working fit in connection with the work, and holds such gripping member so applied to the work. The arrangement of the points of connection of the ends of the gripping member with the handle member with relation to the work as set forth permits the grip of the member B, as described, and causes it to be released automatically when the handle member is thrown in a direction opposite to that in which it travels when acting upon the work.

The entire wrench or tongs is relatively simple in construction and inexpensive in production, taking into consideration the manifold advantages of the invention, including those initially stated as objects thereof which are attained, as will be manifest, from the above description and statements.

We do not desire to be limited in an interpretation of the invention to specific details and features, further than those necessarily required in practising the invention.

Having thus described our invention, we claim and desire to secure by Letters Patent:

1. A device of the character set forth, comprising a handle member provided at one end with a flexible member adapted to surround and grip the work, and means connecting both ends of said flexible member with such handle member at spaced points, one such means comprising a rotatable adjusting member upon the handle member and having an axis lying transversely thereof, and a member for holding said rotatable member in position of adjustment.

2. A device of the character set forth, comprising a handle member provided at one end with a flexible member adapted to surround and grip the work, and means connecting both ends of said flexible member with such handle member at spaced points, one such means comprising a rotatable adjusting member upon the handle member and having an axis lying transversely thereof, and a member for holding said rotatable member in position of adjustment; said rotatable adjusting member being provided with spaced notches, and said last named member comprising a spring pressed latch coöperating with said notches.

3. A device of the character set forth, comprising a handle member provided at one end with a flexible member adapted to surround and grip the work, and means connecting both ends of said flexible member with such handle member at spaced points; one such means comprising a rotatable adjusting member upon the handle member and having an axis lying transversely thereof, and a member for holding said rotatable member in position of adjustment; said rotatable adjusting member being provided with spaced notches, and said last named member comprising a spring pressed latch coöperating with said notches; said flexible member comprising a plurality of inter-engaged links.

4. A device of the character set forth, comprising a handle member provided at one end with a projecting nose and with a rotatable adjusting member inward of the nose, and a flexible work gripping member connected at its respective ends with the handle member at said nose and through the agency of said adjusting member; said adjusting member comprising a rotatable body upon and rotating independently of the handle member and having an axis lying transversely thereof and provided with spaced notches, there being provided a latch coöperating with said notches to hold the adjusting member in position of adjustment, and said flexible member being eccentrically connected with said rotatable body.

5. A device of the character set forth, comprising a handle member provided at one end with a projecting nose and with adjusting means, and a flexible work gripping member connected with said handle member at one end at said nose and at the other end with said adjusting means; said flexible member being provided with end links one of which is bifurcated to straddle said nose and the other of which is bifurcated to straddle the end of the handle member for connection with said adjusting means.

6. A device of the character set forth, comprising a handle member provided at one end with a projecting nose and with adjusting means, and a flexible work gripping member connected with said handle member at one end at said nose and at the other end with said adjusting means; said flexible member being provided with end links one of which is bifurcated to straddle said nose and the other of which is bifurcated to straddle the end of the handle member for connection with said adjusting means; and retaining means extending between the handle member and said end link which straddles said nose.

7. A device of the character set forth, comprising a handle member provided with a flexible member comprising a chain having links adapted to surround and grip the work; each of said links being provided with opposed curved faces the curvature of one of which said faces is of a greater radius than the curvature of the other of which said faces.

8. A device of the character set forth, comprising a handle member provided with a flexible member comprising a chain having links adapted to surround and grip the work; each of said links being provided with opposed curved faces the curvature of one of which said faces is of a greater radius than the curvature of the other of which said faces; said chain being provided with end links with which the other links are reversibly connected.

9. A device of the character set forth, comprising a handle member provided with a flexible member comprising a chain having links adapted to surround and grip the work; each of said links being provided with opposed curved faces the curvature of one of which said faces is of a greater radius than the curvature of the other of which said faces; said chain being provided with end links with which the other links are reversibly connected, one of said end links having a facial curvature for presentation to the work.

10. A device of the character set forth, comprising a handle member provided at one end with a flexible member adapted to surround and grip the work, and means connecting both ends of said flexible member with such handle member; said flexible member comprising a plurality of interengaged links, and hinge connections between said links; each of said links having opposed faces each adapted for presentation to the work and each curved to a radius of different length, and said hinge connections being closer to said faces of greater radius than to the faces of lesser radius.

In testimony whereof, we have signed our names to this specification in the presence of two subscribing witnesses.

WILLIAM G. KNAPP.
CHARLES E. WILCOX.

Witnesses:
RAYMOND IVES BLAKESLEE,
ALFRED H. DAEHLER.

Copies of this patent may be obtained for five cents each, by addressing the "Commissioner of Patents, Washington, D. C."